Dec. 7, 1971  F. E. FREIHEIT  3,624,861
RUG SCRUBBER

Original Filed Aug. 14, 1967

INVENTOR.
FREDERICK E. FREIHEIT
BY
ATTORNEYS

Dec. 7, 1971   F. E. FREIHEIT   3,624,861
RUG SCRUBBER

Original Filed Aug. 14, 1967   6 Sheets-Sheet 2

INVENTOR.
FREDERICK E. FREIHEIT
BY
ATTORNEYS

Dec. 7, 1971   F. E. FREIHEIT   3,624,861
RUG SCRUBBER

Original Filed Aug. 14, 1967   6 Sheets-Sheet 4

INVENTOR.
FREDERICK E. FREIHEIT
BY
ATTORNEYS

United States Patent Office 3,624,861
Patented Dec. 7, 1971

3,624,861
RUG SCRUBBER
Frederick E. Freiheit, Muskegon, Mich., assignor to Clarke Floor Machine Division, Studebaker Corporation, Muskegon, Mich.
Continuation of application Ser. No. 660,289, Aug. 14, 1967. This application Oct. 10, 1969, Ser. No. 866,147
Int. Cl. A471 11/30
U.S. Cl. 15—320                                   5 Claims

ABSTRACT OF THE DISCLOSURE

A portable rug scrubbing unit having scrubbing, foam generating and vacuuming assemblies incorporated directly therein. The driving motor has an elongated shaft upon which are mounted a vacuum impeller assembly, a pressure impeller assembly and a pulley for driving the cylindrical scrubbing brushes. The brushes rotate in opposite directions via a gear train and by selectively shifting the handle, the operator may shift the weight of the device from one to the other of the brushes, thus tending to move the machine rearwardly or forwardly. Liquid detergent is supplied to a former assembly located adjacent the brushes. The foamer assembly mixes prescribed amounts of detergent and air causing it to emit therefrom onto the brushes in the form of dry foam which, when worked into the carpet by the scrubbers, suspends dirt and other foreign particles therein. The vacuum squeegee is positioned forwardly of the brushes, permitting the operator to scrub during forward motion of the machine and vacuum finally during the rearward motion of the machine. Suitable valves are provided, of course, for deactivating the foamer during any desired period.

The foam and particles suspended therein are transferred via the suction impeller to a suitable receptacle positioned on the handle of the machine. It is understood that this abstract is not to be utilized to limit the scope of this invention.

BACKGROUND

This is a continuation of application Ser. No. 660,289, filed Aug. 14, 1967, now abandoned.

This invention relates to carpet cleaners and, more particularly, to such cleaners adapted to introduce dry foam onto the pile and vacuum up the dirt containing residue in one continuous operation.

Mechanized carpet cleaning machines have been available for a number of years. Certain types of these machines have been specifically designed to be portable so as to permit cleaning of carpets at the situs of their installation, thus eliminating the necessity of taking them up off the floor and transporting them to a central cleaning facility. While these portable cleaners have substantially reduced the time and expense involved in cleaning carpeting, they have not proved particularly satisfactory from a number of standpoints.

Initially, machines of the portable type which have been proposed heretofore which are sufficiently powerful to do a relatively thorough cleaning job are so heavy and/or bulky as to render their transportation from cleaning location to cleaning location extremely tedious. In addition to the problems of weight and bulkiness, the cleaning effectiveness or efficiency of these machines has been the subject of a good deal of adverse comment. As a rule, the prior art machines have a marked tendency to redistribute the dirt and other undesirable matter present in the carpet pile rather than lift it therefrom.

Modern day advances in the field of detergent-type cleaning mechanisms have rendered possible the immediate vacuuming of carpet subsequent to the time that the foam is applied thereto and scrubbed into the pile. These advances have permitted incorporation of the vacuuming or pickup machine integrally with the foam application and scrubbing mechanisms. A number of types of machines have been proposed heretofore which attempt to integrally incorporate these various elements within the same structure. As has been the case with prior non-integrated machines, the resultant cleaners are bulky and heavy and do not clean with sufficient efficiency to justify their expense.

Prior art machines have consisted primarily of one or more scrubbers positioned at or near the forward extremity of the machine being adapted to receive foam from some type of foam generating mechanism and work it into the carpet pile. The vacuum section of the machine is positioned rearwardly of the scrubber such that, as the machine is pushed forward, the carpet is sequentially scrubbed with the foam and residue vacuumed up. It will be readily apparent that with such a system, the operator is continually walking over the carpet as he pushes the machine along subsequent to the time that it has been scrubbed and vacuumed. Since the vacuum does not completely dry the carpet, such stepping tends to compress the pile into the supporting fabric and render the completed appearance of the carpet unsatisfactory. The pile can only be revitalized while it remains damp from the cleansing solution. Thus, even if it is vacuumed several times after having been allowed to dry, it will not reassume its desirable, upstanding state until such time as it has been remoistened and vacuumed.

A somewhat related problem in the intergrated carpet scrubbers proposed heretofore is the difficulty experienced by the operator in maneuvering the machine over the carpet to be cleaned. The weight and bulkiness, in addition to the grasping tendency of the scrubbers, has rendered the machines extremely difficult to control positively.

OBJECTS AND SPECIFICATION

It is an object of this invention, therefore, to provide an integrated carpet cleaning device which is not subject to the disadvantages outlined above.

More particularly, it is an object of this invention to provide a portable carpet cleaner mechanism wherein the cleansing and vacuuming mechanism are integrally incorporated into a single machine and, yet, wherein the resultant machines may be maneuvered by the operator with relative ease and may be moved from location to location with similar ease.

Thus, it is an object of this invention to provide a cleaner of the type described which is relatively light in weight, considerably less bulky than previous machines and, yet, which is capable of a cleaning efficiency heretofore unachieved in the prior art.

It is an object of this invention to provide a carpet cleaner having the vacuum or pickup section thereof so positioned that the operator is not required to walk on the damp carpet pile subsequent to the cleaning thereof and, thus, wherein the finished appearance of the carpet is markedly improved over that previously obtainable.

It is yet another object of this invention to provide an apparatus of the type described wherein the rotary cleaning brushes may be removed from the machine for renewal or replacement with relative ease.

It is an object of this invention to provide an apparatus of the type described wherein the flow of cleansing agent into the foaming mechanism and, thus, onto the carpet may be positively controlled by the operator.

It is an object of this invention to provide a device of the type described embodying a novel foaming chamber which effectively mixes the cleansing agent with air such that it may be deposited onto the carpet in a relatively dry state to promote optimum cleansing conditions for rotating brushes.

It is an object of this invention to provide a device of the type described wherein the various impellers and brushes are driven from a common motor shaft, thus eliminating expensive and trouble prone multiple power interconnections.

It is still another object of this invention to provide a device of the type described wherein the cleansing brush depth may be adjusted to permit optimum operating conditions for the particular type of carpet being cleaned.

These as well as other objects of this invention will be readily understood by those skilled in the art with reference to the following specification and accompanying figures in which:

Briefly, this invention comprises a carpet scrubber having a solution tank, means for mixing the solution with air to convert it to foam, means for discharging the foam onto a carpet to be cleaned, rotating scrubber means for working the foam into the pile of the carpet, vacuuming means integral with the scrubber for vacuuming the foam and dirt suspended therein from the floor front roller support means, rear roller support means, and a control handle mounted on the rear of the scrubber. The vacuum means is mounted forward of the scrubber means whereby vacuuming will occur subsequent to the time that the operator has walked upon a particular section of the carpet being scrubbed as the scrubber is drawn backward.

This invention comprises, additionally, means for redistributing the weight of the machine on the rotating brushes at the operator's command to cause the machine to move rearwardly or forwardly. Means are provided, additionally, for adjusting the depth of the scrubbing brushes such that the machine may be set for optimum cleaning conditions regardless of the particular type of carpet to be cleaned.

Figures 1, 2:
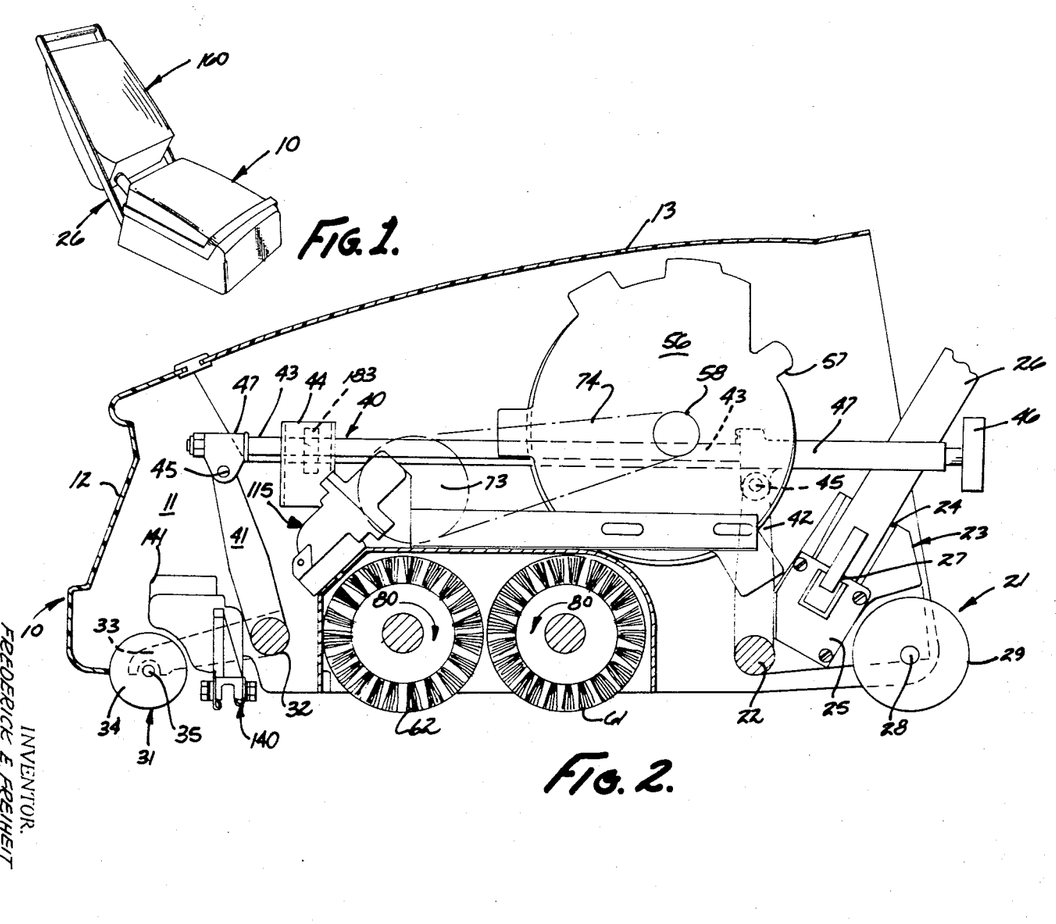
FIG. 1 is a perspective view of the novel carpet scrubber which is the subject of this invention.
FIG. 2 is a fragmentary, sectional, side-elevational view of the scrubber assembly.

Referring now to the figures, a preferred embodiment of this invention will be illustrated in detail. Referring initially to FIG. 1, the novel scrubber which forms the subject of this invention is shown as comprising a scrubbing section or chassis indicated generally by the reference numeral 10 to which an operator handle 26 is affixed in a manner to be described in detail hereinafter. Chassis or housing 10 is covered by a suitable hood 13. Suspended between the handle legs is the collection tank assembly 160. As will be obvious to those skilled in the art, the machine is operated by grasping the upper horizontal portion of the handle 26 and moving it either forwardly or rearwardly as desired.

Referring now specifically to FIGS. 2 through 5, the lower support system upon which the machine is rotatably carried comprises a rear roller assembly 21 and a front roller assembly 31. Rear roller assembly 21 comprises a pivot shaft 22 suitably journalled in either side of the scrubber assembly sidewalls 11. A support bracket 23 (see FIG. 2) is affixed to the shaft 22 for pivotal movement therewith at each side of the machine. The support brackets 23 contain inwardly facing grooves 24 which are covered along the lower portions of their extent by plates 25. The grooves 24 and plates 25 combine to form a recessed area into which the handle section 26 are adapted to fit and be removably secured thereto by means of latches 27.

The roller shaft 28 is supported between facing brackets 23 and has mounted thereon a plurality of roller segments 29 which, conveniently, may be of plastic construction. The rear roller is sectionalized in the manner shown so as to facilitate rotation of the machine by the operator as is well-known in the art.

The front roller assembly 31 comprises a shaft 32 pivotably mounted between the sidewalls 11 of the assembly in a manner similar to the mounting of shaft 22. Extending from shaft 32 and affixed for pivotable movement therewith are a pair of roller engaging arms 33 which, as shown in FIG. 2, function to carry the front roller 34 on its shaft 35.

The roller follower assembly 40, which servos the forward and rear rollers to the operator handle position comprises a forward lever 41 solidly attached to shaft 32. A rear lever 42 which, conveniently, may be integrally fabricated with one of the support brackets 23 at the rear of the machine as shown in FIG. 2, extends upward and is affixed for rotation with shaft 22. The upper extremities of levers 41 and 42 are tied together by means of a tie rod assembly comprising a suitable tie rod 43 running through a travel-limiting gudie 44. Tie rods 43 is pivotably affixed to the extremities of levers 41 and 42 as indicated at 45 and means such as indicated at 46 are provided for adjusting its effective length. While not shown in detail, it will be readily appreciated by those skilled in the art that the length-adjustment means for tie rod 43 may comprise, for example, suitable threading in the sleeves 47 which pivotably connect to the levers 41 and 42 operating in conjunction with suitable converging and diverging threading on the rod 43. In this particular case, as knob 46 (which is connected to and forms an integral part of rod 43) is rotated, the levers 41 and 42 will be drawn toward or away from one another depending upon the direction of rotation. If the levers 41 and 42 as shown in FIG. 2 are caused to diverge (i.e.—lever 41 moved counterclockwise about pivot 32 and lever 42 moved clockwise about pivot 22) by the rotation of handle 46, the chassis of the machine will be raised effectively with respect to the running surfaces of rollers 34 and 29. That is to say that such diversions will cause arms 33 to rotate counterclockwise as viewed in FIG. 2, thus lowering the forward and rear roller assemblies with respect to the chassis of the machine. If on the other hand, the effective distance between the levers 41 and 42 is shortened by adjustment of the knob 46, the effective height of the rollers with respect to the chassis of the machine will be decreased in a similar manner.

Referring now specifically to FIG. 2, the rear cylindrical brush 61 and the forward cylindrical brush 62 rotate in opposite directions as indicated by the arrows 80 in a manner to be discussed in more detail hereinafter. The roller follower assembly 40, just described, permits a selective shifting of the weight between the rollers 61 and 62 and, thus, permits selective powering of the cleaning apparatus in either a forward or reverse direction. More particularly, if operating handle 26 is pulled downward by the operator, the brackets 23 rotate on shaft 22 effectively lowering the shaft 28 and roller sections mounted thereon with respect to the side walls 11 of the apparatus. The rotation of brackets 23 is transmitted to shaft 32 at the forward extremity of the machine by means of levers 41 and 42 and tie rod assembly 43 causing the forward roller 34 to be effectively raised with respect to the sidewalls 11 of the apparatus. The lowering of the rear roller assembly 21 and the raising of the forward roller assembly 31 in this manner, cause a significant shift of weight from cylindrical brush 61 to cylindrical brush 62 and in accordance with the direction of rotation of brush 62, the apparatus will tend to move rearwardly under its own powder. If, on the other hand, the handle is moved upwardly by the operator, the brackets 23 rotate counterclockwise on shafts 22 effectively raising the rear roller assembly 21 with respect to the sidewalls of the machine. The raising of the rear roller segments 29 is transferred via the tie rod assembly to the forward roller assembly 31 causing it to lower with respect to the sidewalls of the machine and thus shift the weight from brush 62 back to brush 61 which causes the apparatus to tend to move in a forward direction under the influence of rotating brush 61. Nut 183 on shaft 43 limits maximum shaft travel to the opening in guide 44.

Figure 3:
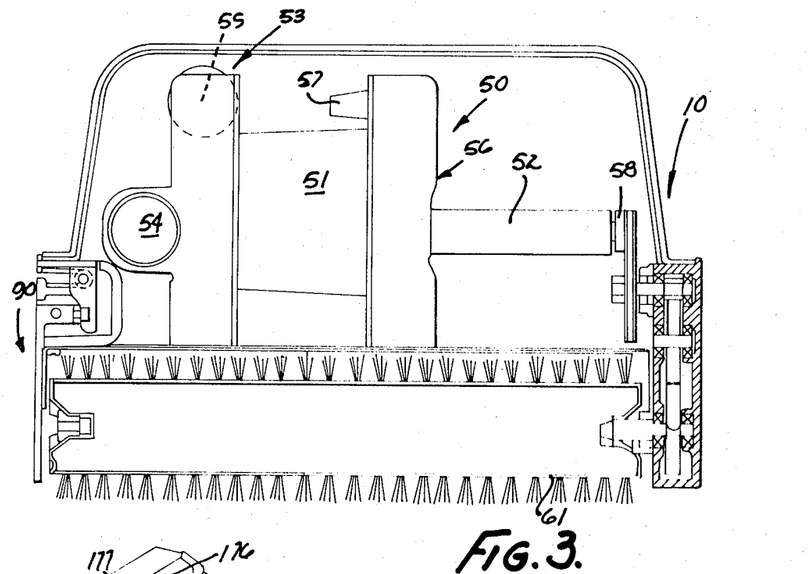
FIG. 3 is a sectional, front-elevational view of the scrubber assembly.

Referring still specifically to FIGS. 2 through 5, the power assembly, indicated generally by the reference numeral 50, comprises a motor unit 51 having an elongated shaft 52 protruding from either side thereof. Positioned to the left of motor 51 as viewed in FIG. 3 is the suction impeller assembly indicated generally by the reference numeral 53. Suction impeller assembly 53 comprises a conventional impeller rotated via shaft 52 and housing having an air intake 54 and an outlet 55. As will be discussed in more detail hereinafter, suction impeller assembly 53 supplies vacuum to squeegee and transfers the foam-entrained dirt particles via the impeller housing to the collection tank assembly.

Positioned on the opposite side of motor 51 from the suction impeller assembly 56. Pressure impeller assembly 56 also comprises a convenional compression impeller and housing having two outlets 57 and an intake (not shown) central of the shaft 52. Shaft 52 extends to the right of pressure impeller assembly 56 as viewed in FIG. 3 and terminates in a pulley 58 which drives the scrubber assembly. As indicated in the drawings, the housing of the suction and pressure impeller assemblies may be fabricated so as to provide support for the motor 51 and its elongated shaft 52.

Figure 6:
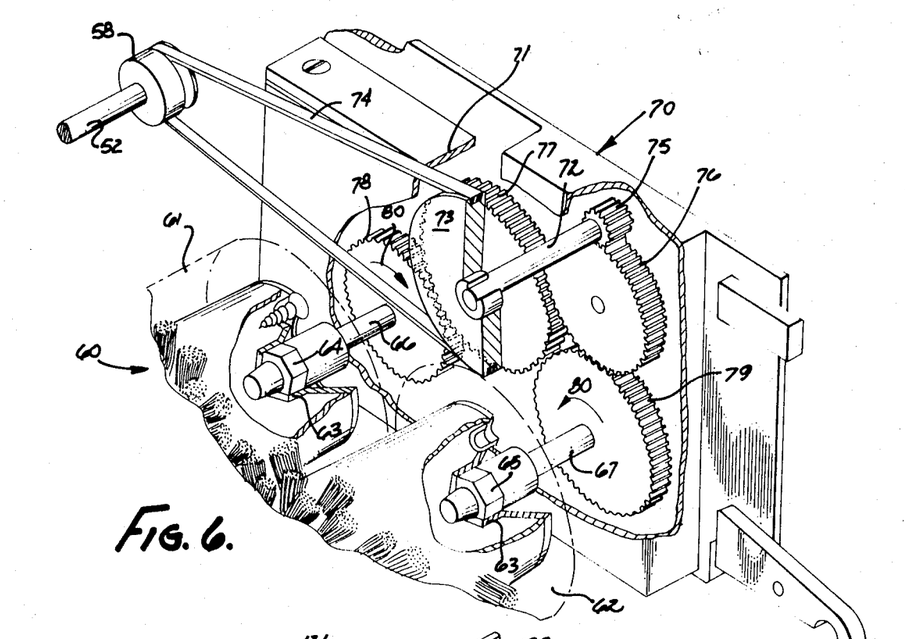
FIG. 6 is a fragmentary, sectional, perspective view of the cylindrical scrubbing brush drive assembly.

Referring now additionally to FIG. 6, the scrubber assembly, indicated generally by the reference numeral 60, comprises a rear cylindrical brush 61 and a forward cylindrical brush 62. Cylindrical brushes 61 and 62, as is well-known in the art comprise cylinders having the brushes imbedded in the peripheries thereof. Each of the brushes 61 and 62 has a hex recess 63 in one extremity thereof adapted to removeably receive a hex driver. Thus, the hex recess 63 in brush 61 removeably receives hex hex driver 64 and the hex recess in brush 62 removeably receives hex driver 64. The hex drivers 64 and 65 are supported via shafts 66 and 67, respectively, which are suitably journalled within the sidewalls 11 of the apparatus.

Rotational thrust is applied to brushes 61 and 62 via the gear-train assembly 70. This assembly comprises a suitable enclosure 71 from which extends the power transfer shaft 72. Shaft 72 has a pulley 73 on the inward extremity thereof which is connected to pulley 58 on elongated shaft 52 by means of a conventional V-belt 74.

Rotational thrust is transmitted from pulley 73 to the gear-train via reduction gear 75 on shaft 72 and gear 76 suitably journalled in rotatable fashion within the machine housing. Gear 76, in turn, drives shaft 67 via gear 79 and, thus, rotates brush 62. Gear 76, additionally, drives reversing gear 77 which transmits power to gear 78 which is affixed for rotation with shaft 66. Thus, as pulley 58 rotates, the brushes 61 and 62 are driven in opposite directions as indicated by the arrows 80. The housing 71 functions to isolate the gear train from dirt, foam and the like which might otherwise impair its function.

Figures 4, 5, 7:
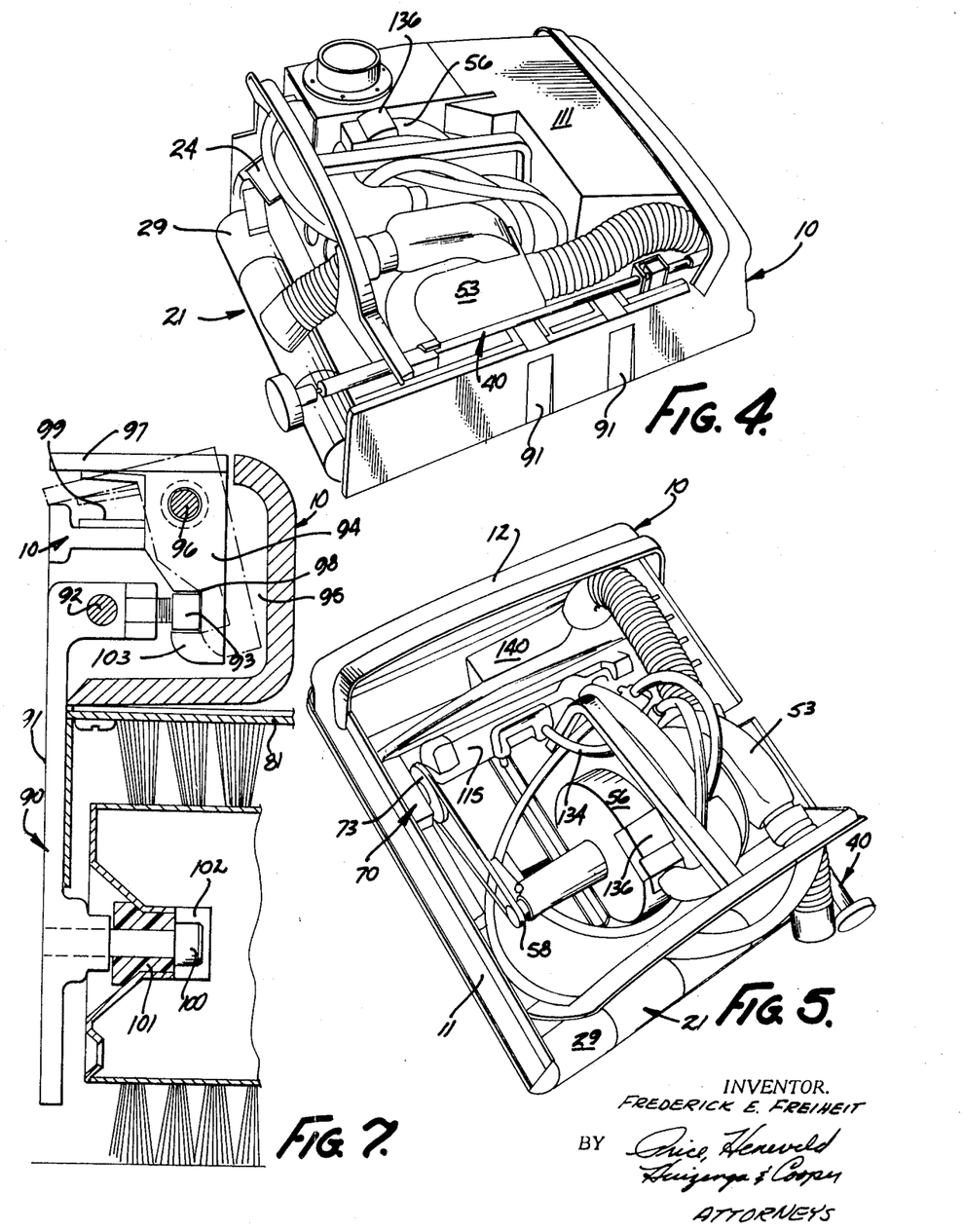
FIG. 4 is a perspective view of the scrubber assembly with the detergent tank in operative position.
FIG. 5 is a perspective view of the scrubber assembly with the detergent tank removed.
FIG. 7 is a fragmentary, sectional, front-elevational view of the brush retaining and replacement assembly.

Referring now additionally to FIG. 7, the brush retaining assemblies 90 (one such assembly being provided for either of the brushes 61 and 62) comprise a plate member 91 pivotably mounted to the sidewalls 11 as indicated at 92. The upper extremity of plate 91 has a protruding circular shoulder 93 which, conveniently, may comprise a conventional cap screw suitably locked into place by means of a lock nut. The plate 91 is maintained in a vertical position by means of a keeper 94 pivotably mounted on sidewalls 11 for movement into and out of the pocket 95 provided in the housing. Keeper 94 has a thumb plate 97 and a shoulder-receiving recess 98. The keeper 94 is biased in clockwise fashion as viewed in FIG. 7 by means of a spring 99.

The plate 91 has extending inwardly from the lower extremity thereof an idler shaft 100 upon which is suitably journalled a plastic bearing 101 adapted to be received by a recess 102 in each of the brushes 61 and 62. The brush extremities shown in FIG. 7, of course, are opposite from those shown adjacent drive train assembly 70 in FIG. 6.

The brush retaining assembly 90 permits removal of the brushes by the mere pushing of the thumb pressure members 97 on keepers 94 downward by the operator against the spring bias. Such pressure causes the keeper 94 to pivot counterclockwise swinging the recesses 98 out of engagement with circular shoulders 93 as shown in phantom in FIG. 7. This, in turn, permits the plates 91 to be rotated in clockwise fashion about pivot points 92 (see FIG. 7) extracting the bearings 101 and shafts 100 from the recesses 102 in the brushes. The brushes may then be dropped slightly and pulled free from the hex drivers 64 and 65 in their opposite extremities. New or replacement brushes may be reinserted in reverse fashion, a camming surface 103 being provided on keeper 94 to assist this function.

Referring now additionally to FIGS. 8 through 12, the foamer assembly, indicated generally by the reference numeral 110, comprises an available space-conforming solution tank 111 having a filler cap 112. The solution tank is connected via conduit 134 to the foam generator 115.

Figure 8:
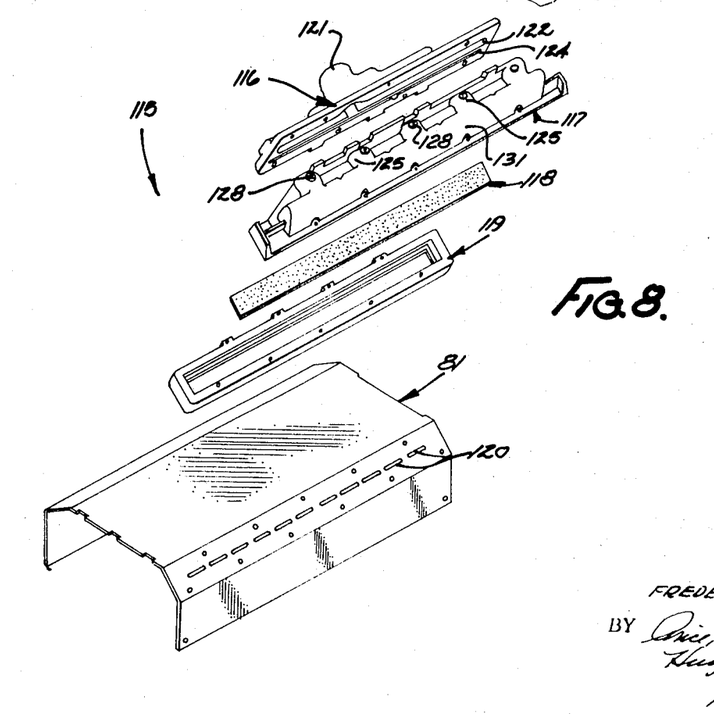
FIG. 8 is an exploded view of the foam generator and brush housing to which it is affixed.

Foam generator 115 comprises an air solution plenum 116, a mixing manifold 117, a mixing pad 118 and a pad retainer 119. The foam generated within foam generator 115 is discharged onto forward brush 62 via apertures 120 in brush housing 81. Because of the direction of rotation of the brushes, the foam is swept between them by brush 62 and onto the carpet being cleaned.

The air and solution plenum 116 of foam generator 115 has an air intake 121 via which air is transferred into an elongated slot 122 running the entire length of the generator. Similarly, the plenum 116 is provided with a liquid detergent intake 123 communicating with an elongated detergent transfer slot 124, also running the entire length of generator 115. The mixing manifold 117 has, in the embodiment shown, a series of five venturi housings 125 in which are positioned the venturi assemblies indicated generally by the reference numeral 126 (see FIG. 10). The venturi assemblies 126 have a cylindrical outer configuration and a venturi-shaped inner configuration. They are sealed into the manifold 117 by means of O-rings 127 positioned in a suitable circumferential groove therein and retained in place by means of set screws 128.

Figures 9, 10, 11, 12:
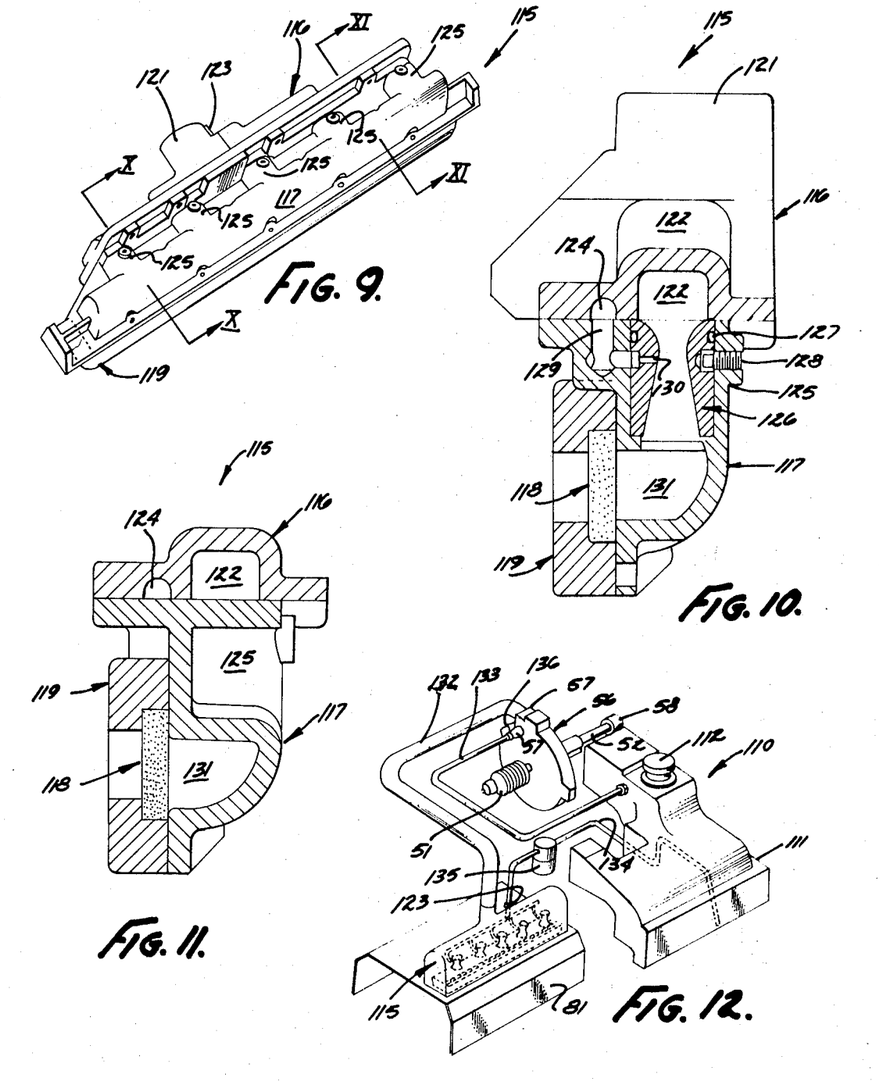
FIG. 9 is a perspective view of the foam generator.
FIG. 10 is a cross-sectional view taken along plane X—X of FIG. 9.
FIG. 11 is a cross-sectional view taken along plane XI–XI of FIG. 9.
FIG. 12 is a schematic, perspective view of the foam generating assembly.

Each of the five venturi assemblies 126 is provided with an intake passage 130 which communicate via a right-angle intake passage 129 in manifold 117 to the elongated detergent transfer slot 124. Downstream from the venturi discharge ports is an elongated mixing chamber 131 running the entire length of the generator. Positioned on the downstream side of the mixing chamber 131 is the mixing pad 118 which, as previously noted is retained in place by means of the pad retainer 119.

During operation of the machine, air pressure is routed to the air intake 121 of plenum 116 from pressure impeller 56 via flexible conduit 132. Flexible conduit 134, which, conveniently, may incorporate a solenoid-type valve to prevent gravity drain of the detergent when the machine is not in use, conducts liquid detergent to intake connection 123. Positive pressure is supplied to the interior of the tank 111 from pressure impelled assembly 56 via lines 133. The impeller assembly 56 may be provided with a flipper valve 136 which may be activated by means of a solenoid. When the valve 136 is closed, conduits 132 and 133 are pressurized and, thus, (assuming solenoid 135 to be open) both air and detergent flow into the foam generator 115. When flipper valve 136 is open, on the other hand, the air from impeller assembly 56 is discharged into the atmosphere and no significant pressure is supplied to either the detergent tank 111 or the foam generator 115.

When the flipper valve 136 is closed, the solenoid 135 opened and the machine in operation, compressed air and liquid detergent are supplied to the mixing manifold 117 via the slots 122 and 124, respectively, in plenum 116. The compressed air travels along slot 122 and into each of the axial venturi openings. While passing through the venturi structures, the compressed air causes a metered amount of solution to be entrained therein via the metering ports 130. The air and entrained detergent are fed into the mixing chamber 131 from the five venturi structures and the mixture migrates along the entire length thereof. The mixture is then forced, under the influence of the incoming compressed air and solution, to migrate through the mixing pad 118.

The pad or filter 118 is fabricated from any one of a number of well-known materials such as non-hygroscopic nylon fiber having a mesh of sufficient size to pass the foam generated in the mixing chamber, but being sufficiently fine so as to prevent passage of liquid detergent in the droplet form. Any droplets present in the mixing chamber 131 are broken up during passage through the foam pad 118 under the pressure of the incoming air and are eventually discharged therefrom in the form of foam.

The foam so generated passes via apertures 120 in brush housing 81 onto the forward cylindrical brush 62 as noted previously and is thereafter worked into the carpet to entrain dirt and other undesirable particles by the brushes. The generator may be deactivated, of course, by merely opening the flipper or by-pass valve 136 which shuts off the supply of compressed air to both the generator 115 and the solution tank 111, or by closing solenoid 135. As an alternative, a solenoid-controlled valve may be inserted in air line 133.

Figures 13, 14:
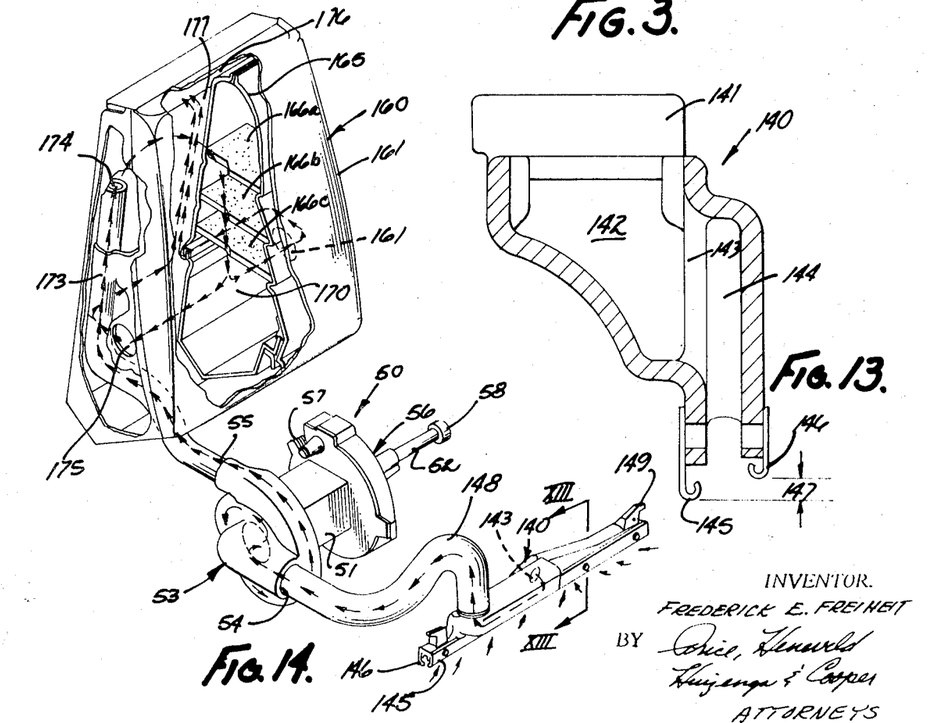
FIG. 13 is a sectional, side-elevational view of the vacuum squeegee.
FIG. 14 is a schematic, fragmentary, perspective view of the vacuuming assembly.

Referring now particularly to FIGS. 2, 13 and 14, the squeegee assembly 140 which functions to remove the foam and entrained dirt particles and the like from the carpet comprises a suction inlet 141 which communicates via a transfer channel 142 and a plenum access aperture 143 to a suction plenum 144. Suction plenum 144 runs substantially the entire width of the machine and is provided at its intake extremity with a forward wiper 145 and a rear wiper 146. As shown best in FIG. 13, the forward wiper 145 extends downwardly a greater distance 147 than does the rear wiper 146 to provide optimum foam and dirt entraining properties for the squeegee assembly. The squeegee assembly 140 is preferably floatably mounted to the chassis 10 with some freedom of vertical movement to permit it to conform to minor variations in the contour of the particular carpet being scrubbed as well as to various settings of the operator's handle and brush-height adjustment 46. This may be accomplished, for example, by mounting the squeegee pivotably about the forward roller shaft 35 via the arms 150 (see FIG. 14 and FIG. 2). This "high-center" pivotal mounting allows the squeegee to "float" upward and offer little resistance during forward machine movement, but forces the squeegee to push downward into the carpet during rearward machine motion, providing vigorous squeezing action to dislodge foam.

As will be noted from FIG. 2, the squeegee assembly 140 is mounted within the apparatus forwardly of the brushes 61 and 62. During the scrubbing process when the machine is being pushed forwardly by the operator, the squeegee functions to pre-vacuum the floor prior to application of the foam and scrubbing of the carpet by the brushes 61 and 62. As the operator pulls the machine rearwardly, the squeegee assembly 140 draws the foam which has been deposited upon the carpet and the dirt entrained therein into the vacuum plenum 144, through vacuum impeller 53 via conduit 148 and discharges it into the collection tank assembly 160 which is suspended between the handle uprights 26.

Figures 15, 16:
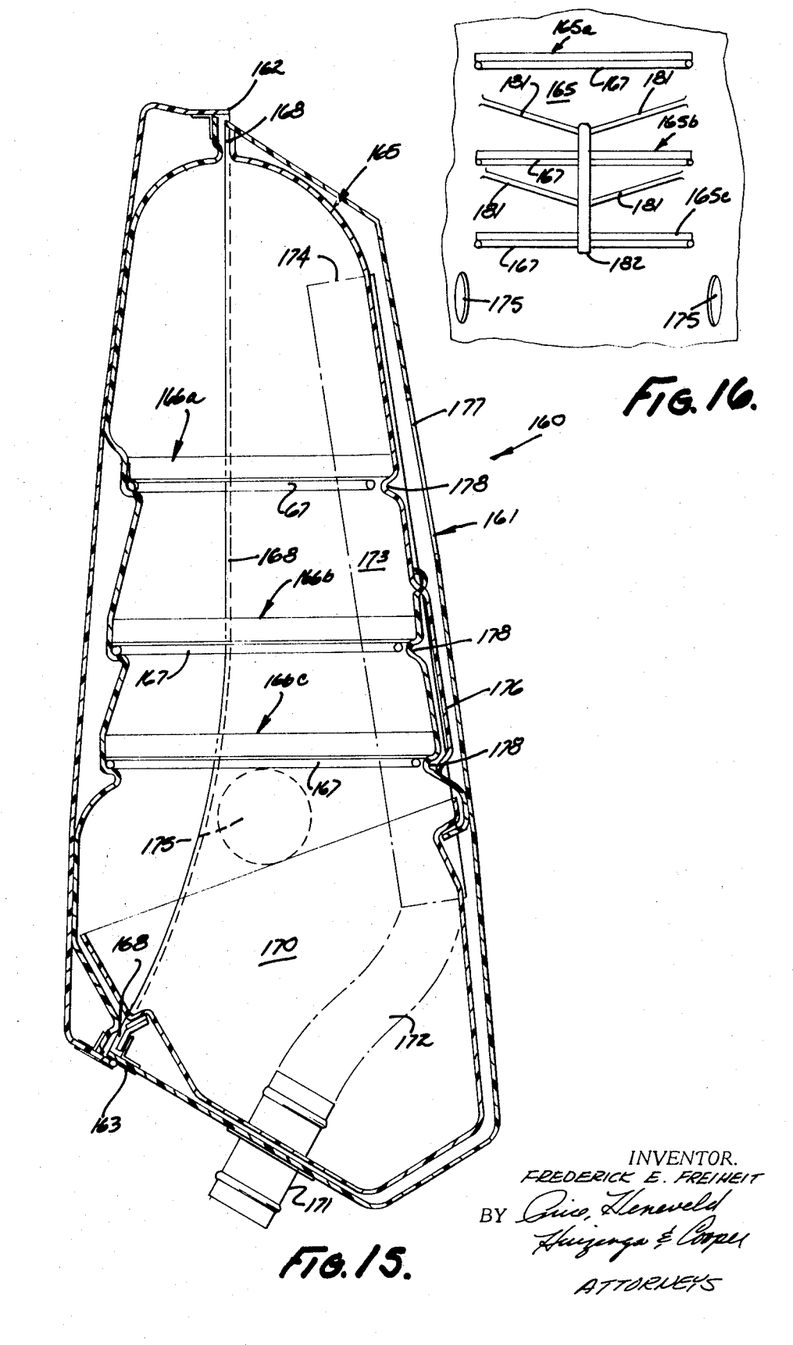
FIG. 15 is a sectional, side-elevational view of the collection tank assembly.
FIG. 16 is a fragmentary, front-elevational view of the collection tank drain assembly.

The collection tank assembly 160, as shown best in FIGS. 14 through 16, comprises an outer jacket 161 having two separable sections connected at one extremity by a hinge 163 and at the opposite extremity by a latch 162. Positioned within the outer jacket 161 is an inner jacket 165 which, conveniently, may be fabricated so as to separate at points 168 about its periphery when the outer jacket 161 is swung to an open position. Inner jacket 165 has positioned across its entire width one or more filter units designated by the references 166a, 166b and 166c. The filters 166 are held in place by a series of filter supports 167 which, preferably, are affixed to the left side of the inner jacket 165 as viewed in FIG. 15 such that the filters swing out with the access panel of outer jacket 161 when it is opened. Conveniently, as shown, a series of ridges 178 may be provided on the right-hand side of the inner jacket 165 to stabilize the filters when the outer jacket is closed and the unit is in operation.

Positioned below inner jacket 165 and, thus, below the filter units 166 is a liquid collection pan 170. The air, foam and entrained dirt particles are fed from outlet 55 of suction impeller 53 into the collection bag assembly via input 171. Input coupling 171 is connected to a standpipe 173 by means of a connecting conduit 172. Standpipe 173 discharges into the inner jacket 165 above the uppermost filter 165a as indicated at 174.

As illustrated best by the arrows in FIG. 14, the air, foam and entrained dirt particles exit from the opening 174 of standpipe 173 and the dirt particles and foam are projected initially towards the filter 166a. Filter 166a functions to collect the foam as well as the dirt particles and, after a period of usage, the upper filter 166a may become saturated with liquid from the condensing foam. The liquid will then pass through the filter onto filter 166b, eventually onto the filter 166c and thereafter into the collection pan 170 or into the bottom of outer jacket 161.

A larger part of the liquid condensed by the filters 166 is drained from their upper surfaces via channel 182 in the rear face of inner jacket 165 (see FIG. 16). As will be noted from FIG. 1, the filters 166 ride on the machine in inclined fashion and, thus, the condensed liquid tends to flow across the tops and through the bodies thereof towards the collection channel 182. That portion of the liquid which emerges from the filters adjacent the rear wall of inner jacket 165 is routed to the channel 182 by the ridges 181. Channel 182 drains directly into the liquid receptacle 170 which may be removed for emptying, when necessary, by opening the outer jacket 161 as discussed previously. Jacket 161 may also be provided with a drain valve to remove liquid collected within it.

The air from the suction impeller 53, after depositing the entrained foam and dirt in the filters, passes from the inner jacket through the apertures 175 on each side thereof and into the space 176 between the inner and outer jackets. The air then flows upwardly to be exhausted at exhaust grate 177 at the rear of the collection bag assembly 160.

OPERATION

When the scrubbing unit is being transferred to the working site, the handle and collection bag assembly may be removed by opening the latches 27 and disconnecting the input coupling 171. The handle extremities may then be removed from the grooves 24 in support brackets 23. After arrival at the site, the apparatus is reassembled, connected to a suitable source of power and the motor 51 activated by means of a suitable switch. The brush height is adjusted suitably for the particular carpet by manipulation of knob 46. The bypass valve 136 is closed and the solenoid 135 opened, also by means of suitable switches which may be located, conveniently, at the upper extremity of collection bag assemblies 160, and the handle 26 raised to pivot support brackets 23 in counterclockwise fashion about shaft 22. As noted previously, the raising of the handles upwardly causes a nonproportionate part of the weight of the apparatus to be transferred to rear brush 61 and the apparatus begins forward movement which, if necessary, may be assisted by the operator.

During this interval, the tank 11 has been pressurized and the liquid detergent flows through tube 134 into the foam generator 115. Pressurized air, similarly, flows into the foam generator via the conduit 132 and the foam formed within the generator issues through the slots 120 and brush housing 81 onto the brushes wherefrom it is brushed into the carpet pile.

At the completion of the forward cycle, the operator lowers the handle raising the rear roller assembly 21 and lowering the forward roller assembly 31, shifting a disproportionate amount of the weight to forward roller 62 causing the apparatus to tend to migrate in a rearward direction. During the rearward cycle, the foam generator may be deactivated by opening damper valve 136 and, thus, depressurizing tank 111. If necessary, also the solenoid 135 may be deactivated during this period to prohibit any tendency of the liquid detergent to drain by gravity into the foam generator 115. As the machine moves rearwardly, the carpet is contracted by the squeegee assembly 140 and the foam and entrained dirt particles sucked through the impeller 53 into the collection bag through the standpipe 173 and discharged into the inner jacket 165 above the uppermost filter 166a. The foam condenses on the filter units 166a, 166b and 166c in the manner discussed previously and drains into the liquid receptacle 170. After passing through the filters 166, the air passes from inner jacket 165 via ports 175, between the inner and outer jackets and out of the exhaust vent 177.

When the cylindrical brushes 61 and 62 become worn or it is desired to remove them for cleaning, it is necessary only to depress the thumb plates 97 against the force of spring 99 into the position shown in phantom in FIG. 7. The side plates 90 may then be pivoted outwardly about points 92 removing the bearing 101 from recess 102 in the brush. The brush may then be pulled from the hex driver at the opposite end. Similarly, a new brush is inserted by raising the side plate 90, sliding the driving extremity into the hex driver, and pivoting the side plate 90 to a vertical position. It is not necessary to redepress the keeper 96 during this interval, since the camming surface 103 will cause it to move counterclockwise about pivot shaft 96 and, thereafter lock into engagement with cylindrical shoulder 93 to retain the brushes in working position.

The forward location of the squeegee assembly 140 with respect to the brushes 61 and 62 permits the operator to vacuum the spent foam and dirt entrained therein from the carpet by drawing the machine rearwardly and, therefore, obviates any necessity of walking on the carpet until it has had a sufficient chance to dry. The obviating of this necessity results in a markedly improved cleaning capability and, additionally, provides a neater appearing cleaning job.

Subsequent to completion of a particular cleaning job, the collection bag 160 is opened, the pan 170 removed and the liquid poured therefrom. If necessary, at this time, the filters may be cleaned or replaced. The collection unit sections are then reunited, the handle assembly along with the collection bag 160 removed and the unit transferred to the situs of the next cleaning job.

Thus, it will be seen that this invention has provided a novel rug cleaning apparatus which is capable of being effectively operated by a single operator and, additionally, which performs at an efficiency much greater than that previously obtainable from prior art devices. The driving of the suction impeller, the pressure impeller and the brushes from a single shaft markedly increase the compactness of the unit while, additionally, permitting arrangement of the other components such that they may perform with optimum efficiency.

While a preferred embodimen of this invention has been described in detail, it will be readily apparent to those skilled in the art that other embodiments may be conceived and fabricated without departing from the spirit of this specification and the accompanying drawings. Such other embodiments are to be deemed as included within the scope of the following claims unless these claims, by their language, expressly state otherwise.

The embodiments of the invention in which an exclusive property or privilege is claimed are defined as follows.

1. In a carpet scrubber having a solution tank, means for mixing said solution with air to convert it to foam, means for discharging said foam onto a carpet to be cleaned, scrubber means for working said foam into the pile of said carpet, vacuum means for vacuuming said foam and the dirt suspended therein from said floor, means for mounting said vacuum means integral with said scrubber, and a front roller, the improvement comprising: said front roller being mounted on a shaft and said vacuum mounting means including connecting means attached to said vacuum means and pivotally attached to said shaft, said attachment to said vacuum means being lower than said attachment to said shaft.

2. In a carpet scrubber having a solution tank, means for mixing said solution with air to convert it to foam, means for discharging said foam onto a carpet to be cleaned, a housing, a pair of cylindrical brushes mounted in said housing, spaced fore and aft with respect to one another, for working said foam into the pile of said carpet, means for rotating said cylindrical brushes in opposite directions, vacuum means for vacuuming said foam and dirt suspended therein from said floor, means for moving said apparatus rearwardly or forwardly under the influence of said cylindrical brushes when rotating, said moving means comprising: a front roller and a rear roller mounted in said housing; means interconnecting said front and rear rollers for changing the relative elevation of said front and rear rollers in opposite directions with respect to said housing whereby the weight of said carpet scrubber can be relatively shifted from one of said spaced cylindrical brushes to the other to thereby cause said scrubber to move forwardly or rearwardly under the influence of one or the other of said rotating cylindrical brushes; said means for changing the relative elevation of said rollers including a handle operably interconnected therewith.

3. The improved apparatus as set forth in claim 2 wherein said front roller is mounted on a shaft and said vacuum means includes a vacuum pick up means; connecting means attached to said vacuum pick up means and pivotally attached to said shaft, said attachment to said vacuum means being lower than said pivotal attachment to said shaft.

4. The carpet scrubber of claim 2 in which said means for changing the relative elevation of said rollers comprises: a first lever being pivotally mounted to said housing; said rear roller being rotatably mounted in said first lever at a point spaced from the pivotal mounting thereof and to the rear of said cylindrical brushes; a second lever being pivotally mounted to said housing; said front roller being rotatably mounted in said second lever at a point spaced from the pivotal mounting thereof and forward of said cylindrical brushes; a tie rod interconnecting said first and second levers; means for reciprocating said tie rod fore and aft to thereby pivot said first and second levers and change the relative elevations of said front and rear rollers with respect to said housing and with respect to one another.

5. The carpet scrubber of claim 4 in which said means for reciprocating said tie rod comprises: said first lever including a bracket; said handle being removably mounted on said bracket whereby when said handle is raised or lowered, said tie rod is reciprocated fore or aft.

References Cited

UNITED STATES PATENTS

| | | | |
|---|---|---|---|
| 1,596,041 | 8/1926 | Young | 15—320 |
| 1,644,859 | 10/1927 | Strader | 15—320 |
| 1,791,812 | 2/1931 | Harrison | 15—49 C |
| 2,266,075 | 12/1941 | Reblogle | 15—384 X |
| 2,333,829 | 11/1943 | Terry | 15—320 |
| 3,101,505 | 8/1963 | Belicka et al. | 15—320 |
| 3,284,830 | 11/1966 | Kroll | 15—49 C |
| 3,370,315 | 2/1968 | Mac Farland et al. | 15—320 |
| 3,392,418 | 7/1968 | Schowalter | 15—320 |

FOREIGN PATENTS

| | | |
|---|---|---|
| 569,799 | 2/1933 | Germany. |
| 210,361 | 9/1957 | Australia. |

WALTER A. SCHEEL, Primary Examiner

C. K. MOORE, Assistant Examiner

U.S. Cl. X.R.

15—50 C, 340, 353, 361, 384